Figure 9:
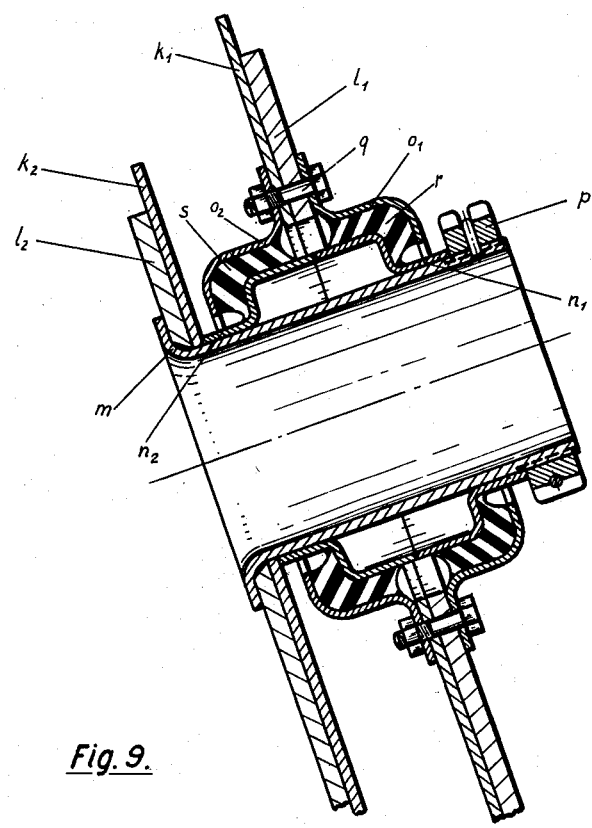

May 11, 1954   B. BARÉNYI   2,678,231
CONNECTING SLEEVE FOR ATTACHING SEPARABLE
VEHICLE UNITS TOGETHER
Filed Dec. 21, 1949   2 Sheets-Sheet 1
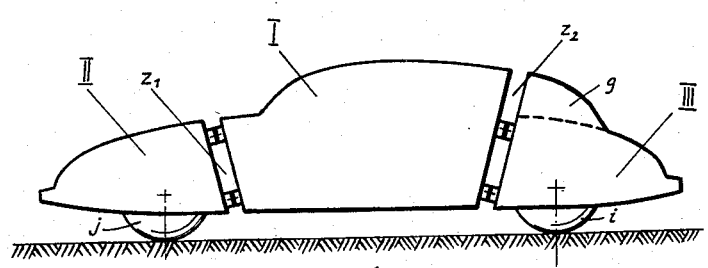
Fig.1.
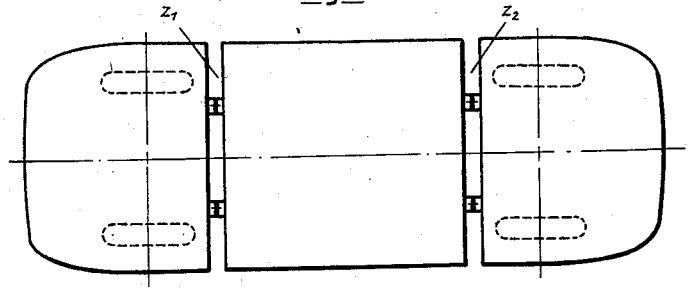
Fig.2.
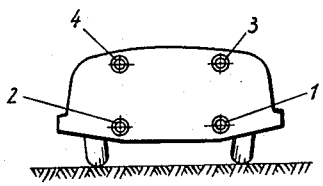
Fig.3.
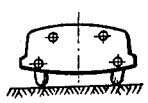 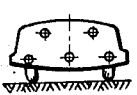 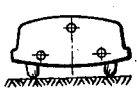 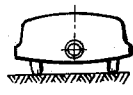 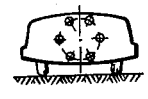
Fig.4.   Fig.5.   Fig.6.   Fig.7.   Fig.8.
INVENTOR:
BELA BARÉNYI
By:
Hazeltine, Lake & Co.
AGENTS Patented May 11, 1954

2,678,231

UNITED STATES PATENT OFFICE 2,678,231

CONNECTING SLEEVE FOR ATTACHING SEPARABLE VEHICLE UNITS TOGETHER

Béla Barényi, Stuttgart-Rohr, Germany

Application December 21, 1949, Serial No. 134,296

Claims priority, application Germany December 23, 1948

1 Claim. (Cl. 296—28)

This invention relates to a motor vehicle manufactured in cell-type structure.

More particularly, this invention relates to a connecting sleeve that is to be used for joining two separable vehicle units together.

The application of the so-called cell-type structure permits a particularly economic manufacture of motor vehicles. The separate production of component vehicle parts for the subsequent assembly of a complete motor vehicle, enables by simply interchanging e. g. different vehicle parts (such as rear and front parts) capable of being mounted on a front, central and rear portion of a vehicle to produce a considerable number of vehicle types out of a small number of component part types for the front, central or rear portion. Furthermore, two motor-driven steering sections may be attached to a body to provide a vehicle capable of being driven in either direction. Also, two engine-driven sections may be attached to a body which is desirable where the vehicle is to be equipped with railroad wheels and to be operated on a railroad track as a motor coach.

Another object is a further simplification and a still greater economy in the manufacture and in the assembly of cell type structure vehicles. One feature of the invention accordingly consists essentially in that in a motor vehicle comprising (at least) one central portion and two end portions, both the end portions are attached to the central portion in such a manner as to permit their becoming interchanged. Such an interchangeable attachment has above all the advantage that for producing the connections for the front and rear portions the same fixtures, machines, tools, gages etc. may be utilized, which means a substantial economy in the production and in the repair of vehicles.

With a view to serve the same purpose the two end portions are designed such that the main dimensions of the same, in particular their plan-form, i. e. overall length and width of the end portions are equal so that manufacture, machining and assembly may be effected substantially in the same manner and with the same aids. It is convenient to have in the two end portions also equal distances of the vehicle axles from the junction area.

The most favorable result is obtained by simultaneously making provision for the two aforementioned measures, which means not only to provide for an interchangeable attachment of the vehicle end portions to the central portion but at the same time also to give the end portions the same or as much as possible the same main dimensions. In this case there will be no unequal dimensions of the work pieces (i. e. of the vehicle end portions) to be taken into consideration in the dimensioning and in the installation of the fixtures.

In the drawings, Fig. 1–3 inclusive diagrammatically illustrate an embodiment of the invention giving a longitudinal section, a plan view and a cross-sectional view of the same. Figs. 4–8 inclusive are diagrammatic illustrations of five other modifications of the junction cross-sections. Fig. 9 is a longitudinal section through a junction point with the interpositioning of resilient members.

The vehicle consists of three cells, a central portion I, a front portion II and a rear portion III.

A junction is effected in four points 1, 2, 3, 4 in the same way in front and behind. The attachment may be effected by screws, balls or in any other manner, conveniently by easily separable couplings, rigidly or resiliently, for instance by the interpositioning of rubber parts. In particular the horizontal distances and the vertical distances between the junction points are equal in front and at the rear for the attachment of the vehicle end portions. At the same time both vehicle end portions have the same plan-form, in particular the same overall width and the same length. In the side view, the rear portion III distinguishes itself from the front portion II only by the body top portion $g$ placed on the rear portion which latter for the rest is equal in shape to the front portion. The driving unit is arranged e. g. in the rear portion and drives the rear wheels $i$ mounted on oscillating axle shafts, while the front wheels $j$ are independently suspended on the frame by parallelogram.

While there could be provided curved joints or connection surfaces perpendicular to the road, the vehicle according to Figs. 1–3 has its connection surfaces or joints $z_1$, $z_2$ extending obliquely with respect to the road. The connection is effected—e. g. by means of separable couplings—on four points 1–4.

Instead of connecting the end portions in four points, the connection may be effected also in any other number of points, as illustrated in Figs. 4–8 inclusive. There may be provided also any other arrangements of the points, provided only that the connection is effected in the same manner in front and behind. In Fig. 7 the connection is by flanging e. g. to a central tubular chassis.

Fig. 9 shows a preferable type of connection used to join an end cell to the central vehicle cell by means of resilient buffers. In Fig. 9, $k_1$ and $k_2$ are the end panels of adjacent cells to be connected to each other, the panels being stiffened at the connection areas by reinforcing plates $l_1$ and $l_2$. Into the reinforcing plate $l_2$ of the panel $k_2$, a sleeve $m$ of substantial diameter is inserted. The term "substantial diameter" is used to distinguish this sleeve from a pin, which typically is of comparatively small diameter. Upon the sleeve member $m$, a comparatively tightly fitting ring means is inserted, which ring means can be made in two Z-shaped ring portions, $n_1$ and $n_2$. This ring means is therefore of substantially U-shape, having longitudinally extending flanges, and it can be axially secured to the sleeve $m$ by a threaded nut $p$.

Secured to the panel $k_1$ of the adjacent vehicle cell, and also to the reinforcing plate $l_1$, is an outer ring means, composed of two ring portions $o_1$ and $o_2$, each of which is typically of S-shape cross section. Upon portions $o_1$ and $o_2$ being bolted together by means of a bolt $q$, a ring of U-shaped cross section is formed, which is concentric with and larger than the ring formed by members $n_1$, $n_2$. Between the ring $n_1$, $n_2$ and the outer ring formed by portions $o_1$ and $o_2$ are interposed resilient members $r$ and $s$, which may be vulcanized respectively to the members $o_1$, $n_1$ and $o_2$, $n_2$. The rubber buffers take up shocks both in axial and in radial direction and may be arranged, of course, also in any other manner, such as by interposing plate- or block-shaped rubber members between the walls $k_1$ and $k_2$. Instead of using rubber buffers, metallic springs may be provided.

What I claim is:

A cell type vehicle comprising at least two vehicle portions, each portion having a substantially upright end panel; at least one means for resiliently and detachably connecting two adjacent vehicle portions, said means including: an inner sleeve-like member of substantial diameter to permit vehicle control elements to pass therethrough, fastened to a first panel, and extending outwardly therefrom; a second sleeve-like member, located in a second panel and having an inner diameter only slightly larger than the diameter of said inner sleeve-like member, and adapted to receive said inner sleeve-like member in telescoping relation; said second sleeve-like member comprising spaced concentric inner and outer ring means of substantially U-shaped cross section, the arms of each U-shaped ring means being radially disposed, the web or central portion of the U's located outwardly with respect to the arms of the U's; said inner ring means having flanges extending longitudinally outwardly from the ends of the arms of the U; said inner and outer ring means being in two longitudinal sections, each section itself being ring shaped; each of said sections of said outer ring means having a resilient member of substantial width secured around its inner surface and to the outer surface of the adjacent section of said inner ring means; means to assemble together said two sections of said outer ring means and to secure said sections to said second panel; the outer ring means when assembled in position, forming a U-shaped ring substantially encompassing the U-shaped inner ring means; fastening means to secure said inner sleeve-like member, said inner ring means of said second sleeve-like member and said first panel tightly together, whereby said sleeve-like members form a joint having both radial and longitudinal resilience.

References Cited in the file of this patent

UNITED STATES PATENTS

| Number | Name | Date |
| --- | --- | --- |
| 1,953,515 | Smith | Apr. 3, 1934 |
| 2,248,319 | Waterhouse, Jr. | July 8, 1941 |
| 2,425,948 | Lucien | Aug. 19, 1947 |

FOREIGN PATENTS

| Number | Country | Date |
| --- | --- | --- |
| 152,886 | Austria | Mar. 25, 1938 |
| 486,968 | Great Britain | June 14, 1938 |
| 491,383 | Great Britain | Sept. 1, 1938 |
| 506,845 | Great Britain | June 6, 1938 |
| 893,936 | France | Mar. 6, 1944 |

OTHER REFERENCES

Ser. No. 368,684, Barenyi et al. (A. P. C.), published May 25, 1943.